United States Patent [19]

Ruspa

[11] Patent Number: 4,889,394
[45] Date of Patent: Dec. 26, 1989

[54] MOUNTING ARRANGEMENT FOR POSITIVELY FIXING A WHEEL COVER DISK TO THE WHEEL RIM OF AN INDUSTRIAL VEHICLE

[76] Inventor: Renzo Ruspa, Rotta Magnabergera 8, I-10070 Fiano Torinese, Italy

[21] Appl. No.: 222,512

[22] Filed: Jul. 1, 1988

[30] Foreign Application Priority Data

Jul. 23, 1987 [IT] Italy ................. 67641 A/87

[51] Int. Cl.$^4$ ................................ B60B 7/06
[52] U.S. Cl. ........................ 301/37 PB; 301/37 R; 301/37 S
[58] Field of Search ............ 301/37 R, 37 AT, 37 P, 301/37 C, 37 CD, 37 TP, 37 PB, 37 S, 37 B, 108 R, 108 S; 215/207, 273; 411/15, 24, 25

[56] References Cited

U.S. PATENT DOCUMENTS 1,937,295 11/1933 Rettenmeyer ................. 215/207

FOREIGN PATENT DOCUMENTS 0123260 10/1984 European Pat. Off. ........ 301/37 CD
2451071  4/1976 Fed. Rep. of Germany .... 301/37 S
2629291  1/1978 Fed. Rep. of Germany ... 301/37 PB
2907858  9/1979 Fed. Rep. of Germany ... 301/37 PB
 735077 11/1932 France ........................... 301/37 R Primary Examiner—Russell D. Stormer
Attorney, Agent, or Firm—Young & Thompson

[57] ABSTRACT

A mounting arrangement applied to a vehicle wheel cover disk in order to allow positively fixing the same to a wheel rim which ends outside with a concave channel edge. The arrangement includes at least three connection devices spaced along the disk periphery in order to engage the concave channel edge of the wheel rim. At least one of these connection devices is movable and comprises engagement members displaceable between a mounting position, in which it may pass inside the channel edge thus allowing mounting the cover disk onto the wheel, and a fixing position in which it engages the channel edge thus positively fixing the cover disk thereto. A part of the connection devices of the cover disk, three or four in number, may be of a fixed type, and these fixed connection devices are situated in correspondence with a half of the disk periphery, whereas the movable connection devices, preferably two in number, are symmetrically arranged at the side of the disk periphery opposite the fixed connection devices. Alternatively, all connection devices may be movable, and they are preferably three or four in number. This mounting arrangement is particularly suitable for cover disks destined to the wheels of industrial vehicles.

4 Claims, 2 Drawing Sheets

MOUNTING ARRANGEMENT FOR POSITIVELY FIXING A WHEEL COVER DISK TO THE WHEEL RIM OF AN INDUSTRIAL VEHICLE

BACKGROUND OF THE INVENTION

This invention refers to a mounting arrangement applied to a vehicle wheel cover disk in order to allow positively fixing the same to a wheel rim, said rim ending outside with a concave channel edge.

In many cases, mainly for light vehicles, the wheel cover disks may be applied to the wheels by means of hooking devices operating by spring release, suitable for engaging undercuts shown by the wheel rims, however in other cases, mainly for heavy vehicles, in general industrial vehicles, it is required that the wheel covers are positively mounted onto the wheels. In such cases recourse is customarily made to special brackets, which are tightened under the wheel fixing screws and are provided with means suitable for receiving, in turn, the wheel covers. However such arrangements are not satisfactory, on one hand in that they involve a undesirable complication in the wheel mounting and dismounting operations, which in this manner concern the cover supporting brackets too, and on the other hand in that the wheel fixing means of different vehicles show many different shapes, whereby it is needed that, in order to allow mounting the wheel cover disks on any vehicle, many kits of different brackets are manufactured and stored, and a selection is made when mounting the wheel covers, thus involving loss of time and giving rise to he possibility of mistakes.

BRIEF SUMMARY OF THE INVENTION

The object of this invention is that of rationalizing the devices for positively mounting wheel cover disks, in order to overcome the stated disadvantages and, particularly, to allow a wheel cover disk to be mounted and positively fixed onto any vehicle wheel having the diameter for which the cover disk is intended, irrespectively of the shape of the wheel fixing means and, in any event, in such a way as to not interfere with said fixing means.

This object is attained, according to the invention, by the fact that the mounting arrangement applied to the wheel cover disk includes at least three connection devices spaced along the disk periphery in order to engage the concave channel edge of the wheel rim, and that at least one of these connection devices is movable and comprises an engagement member displaceable between a mounting position, in which it may pass inside said channel edge of the wheel rim, thus allowing mounting the cover disk onto the wheel, and a fixing position in which it engages said channel edge, thus positively fixing the wheel cover disk.

Thanks to this arrangement, the cover disk having its movable connection devices in the mounting position may be applied to a wheel by passing the engagement members of the connection devices inside the channel edge of the wheel, and then the connection devices are operated to displace from the mounting position to the fixing position their engagement members, which then engage the concave channel edge of the wheel, thus completing a positive mounting of the cover disk. In this way, the disk mounting devices have no relation with the wheel fixing means, whose shape has therefore no significance. A wheel cover disk provided with the mounting arrangement of the invention may be applied to any vehicle wheel of the intended diameter, irrespective of the kind of vehicle to which it pertains, provided that the wheel has a concave channel edge, as in the practice is customary for the presently manufactured wheels for industrial vehicles. The manufacture and storage of special brackets in order to mount the cover disks onto the wheels of vehicles of different kinds are no more required, as well as any selection of mounting means when installing the cover disk. In turn, the wheel mounting and dismounting operations are made without in any way affecting the means intended to allow mounting the wheel cover disk.

In a first embodiment, a part of said connection devices of the cover disk is of a fixed type, and these fixed connection devices are situated in correspondence with a half of the disk periphery in such a way that they may engage by simple insertion the concave channel edge with which the wheel rim ends outwardly, and said movable connection devices are symmetrically arranged at the side of the disk periphery opposite said fixed connection devices.

In this embodiment, said fixed connection devices are preferably three or four in number, and said movable connection devices are preferably two in number.

In another embodiment, all the connection devices are of a movable type. In this embodiment, the movable connection devices should be at least three in number, and preferably they are four in number.

BRIEF DESCRIPTION OF THE DRAWINGS

The features and advantages of the subject of the invention will appear more clearly from the following description of a preferred embodiment, which however has the character of an example and has no limitative purpose. This embodiment is diagrammatically shown in the appended drawings, wherein.

DETAILED DESCRIPTION OF A PREFERRED EMBODIMENT

Figure 2:
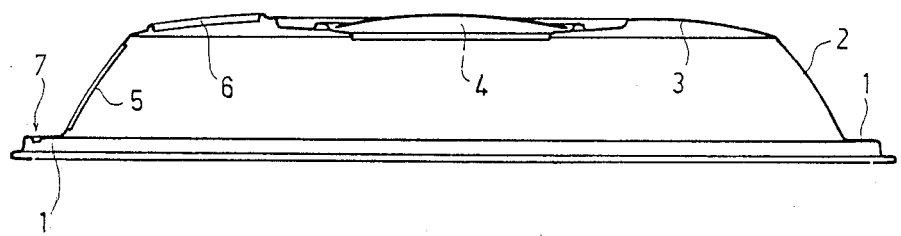
FIG. 2 shows a cross section taken along the broken line II—II of FIG. 1, without the connection devices.
Figure 1:
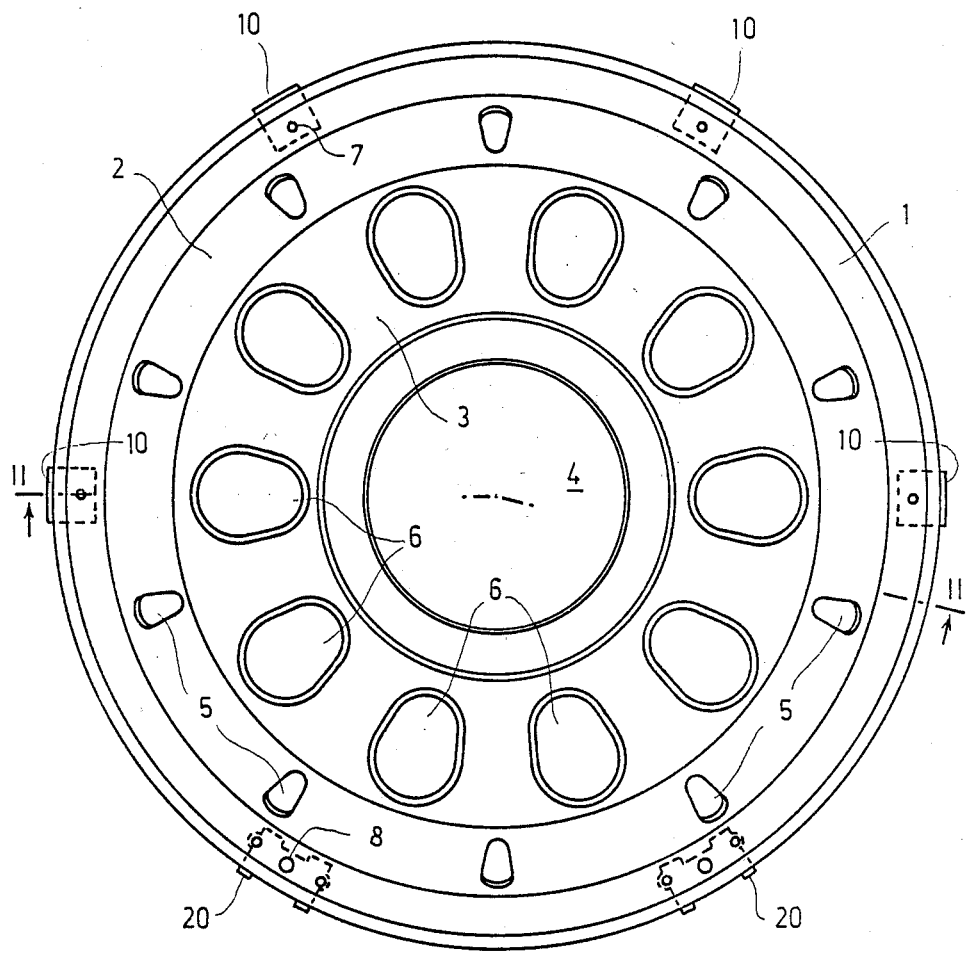
FIG. 1 shows on a small scale a front view of a wheel cover disk having a mounting arrangement according to the invention.

As shown by FIGS. 1 and 2, the described wheel cover disk has a peripheral edge 1 intended to be applied against a wheel rim, a protruding ring 2 and a plate 3 whose central region is customarily intended receive some mark or ornament. In the protruding ring 2 and in the plate 3 there is punched a number of openings, respectively 5 and 6. These openings have an aesthetical purpose and, moreover, they allow ventilation of the braking system of the wheel. The mounting arrangement of the invention concerns the peripheral edge 1 of the cover disk only, and therefore the shape of all other portions of the cover disk is left entirely free and it may be designed at pleasure in view of any aesthetical or technical purpose. It is therefore to be understood that a specific shape of wheel cover disk has been shown with a demonstrative purpose only, but the invention may be applied to cover disks of any shape.

The mounting arrangement comprises, in this case, four fixed connection devices, generally designated as 10, and two movable connection devices, generally designated as 20. Of the fixed connection devices 10, two are diametrically opposite the one another, and the remaining two are equally spaced at 60° of angular distance between the first two, whereby a half of the wheel cover disk is occupied. As it will be more particularly shown in the following, each one of these devices has a projection intended to engage, by simple insertion, the concave channel edge of the wheel rim to which the cover disk is to be applied. As it will be understood, such insertion should not be geometrically possible for two connection devices 10 which are diametrically opposite, but in the general practice, on the contrary, it may be made without any difficulty thanks to a certain elastic deformability of the not yet fixed cover disk, which is made of a thin material. Of course, however, in those specific cases in which one cannot or is not willing to take advantage of such deformability, it is simply needed that the diametrically opposite disposition of two fixed connection devices 10 is avoided. Such disposition, however, is of advantage when allowable, in order to obtain a more stable connection of the cover disk to the wheel rim.

In this case, the movable connection devices 20 are two in number and they are spaced at 60° of angular distance between the two diametrically opposite fixed connection devices 10, whereby the cover disk is provided on the whole of six connection devices equally spaced along its periphery. This arrangement is particularly rational, however it is to be understood that it is not essential, and also arrangements not equally spaced, or different numbers of connection devices, may be chosen.

Figure 4:
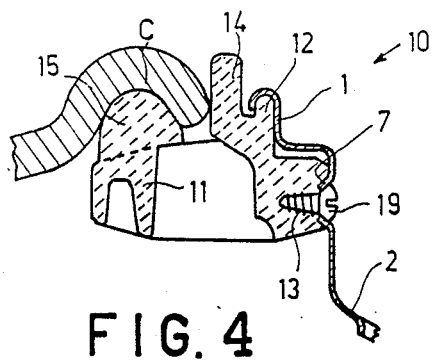
FIG. 4 shows a cross section taken along line IV—IV of FIG. 3, with the fixed connection device applied to a portion of a wheel cover disk periphery and engaged into the concave channel edge of a wheel rim.
Figure 5:
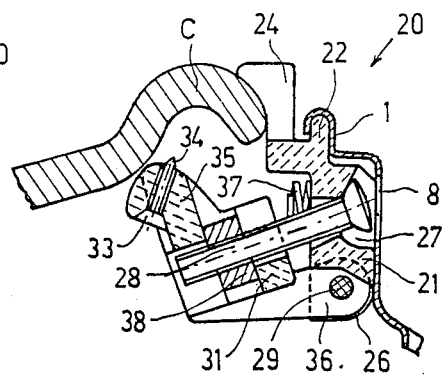
FIG. 5 shows a cross section, corresponding to that of FIG. 4, taken through a movable connection device having the engagement member in the mounting position.
Figure 3:
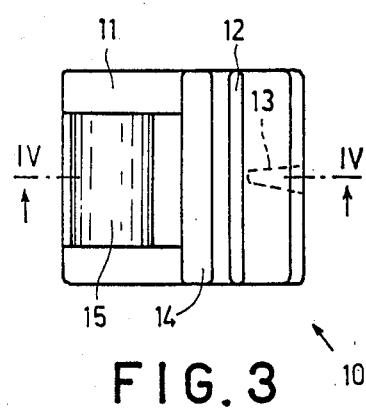
FIG. 3 shows on a greater scale (about life-size) a plan view of a fixed connection device.

With reference to FIGS. 3 and 4, each fixed connection device 10 comprises a body 11 which may be formed of plastics. The body 11 has a projection 12 suitable for engaging the peripheral edge 1 of the cover disk, which is bent inwardly at back. The body 11 also has a hole 13 wherein a threading screw may be screwed in order to fix the connection device 10 to the cover disk. In register with each mounting position of the fixed connection devices 10, the edge 1 of the cover disk has a flared hole 7 for allowing passage to a screw 19. Moreover, the fixed connection device 10 has a rest projection 14, located behind the projection 12 and intended to rest against the wheel rim to which the cover disk is applied. Finally, the fixed connection device 10 has a further projection 15 which is intended to engage the concave channel edge C which forms the outer end of the wheel rim. As it may be seen from FIG. 4, each fixed connection device 10, when inserted into the channel edge C, is capable of ensuring a stable and positive connection of the corresponding portion of the cover disk periphery.

Of course, the means 12, 13 and 19 serving to fix the connection device 10 to the cover disk edge 1 may also receive different shapes and, eventually, they could not require that the cover disk edge 1 be bent inwardly at back.

Each movable connection device 20 (FIGS. 5 to 8) comprises a supporting member 21 and an engagement member 3!. The supporting member 21 may be formed of plastics and it is provided with a projection 22 suitable for engaging the peripheral edge 1 of the cover disk, which as already said is bent inwardly at back. The supporting member 21 also has two holes 23 wherein corresponding screws may be screwed in order to fix the movable connection device 20 to the disk edge 1 by traversing holes of the edge 1, identical to the holes 7. The supporting member 21 further has rest and engagement projections 24, located behind the projection 22 and intended to rest against the wheel rim by grasping its periphery, and it has two flanges 26 wherein there is mounted an axle 29 intended to movably support the engagement member 31. Finally, the supporting member 21 has two seats for springs which will be described later on, and a seat 27 for a traction screw 28, which may be operated through an opening 8 of the cover disk edge 1, foreseen in register with each movable connection device 20.

Also the engagement member 31 may be manufactured of plastics, and it has two flanges 36 by means of which it is pivoted onto the axle 29. The body of member 31 houses a metallic nut 38 in whose threaded hole is screwed the traction screw 28. Member 31 extends into a projection 35 suitable for engaging the concave channel edge C of the wheel rim.

When the engagement member 31 is displaced apart from supporting member 21 (FIG. 5: mounting position), the projection 35 assumes such a position that it may pass inside the concave edge C. Therefore, when all movable connection devices 20 are in said position, after insertion of the fixed connection devices 10 into the channel edge C of the wheel rim, the cover disk may be placed against the wheel rim in its mounting position.

Figure 6:
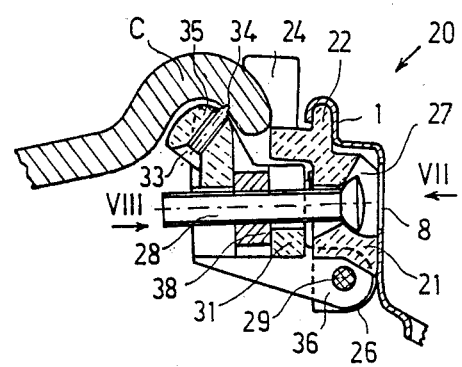
FIG. 6 shows a cross section of the movable connection device of FIG. 5 as it appears when the engagement member has been displaced from the mounting position to the fixing position.
Figure 7:
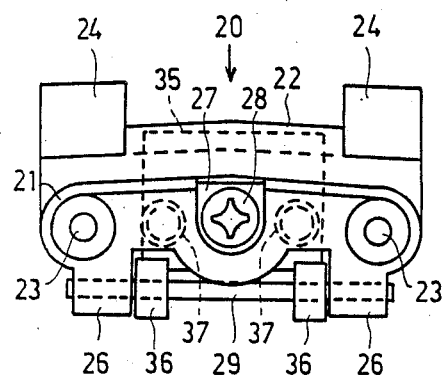
FIGS. 7 and 8 show the movable connection device of FIG. 6 as seen according to the arrows VII and respectively VIII of the same FIG. 6.
Figure 8:
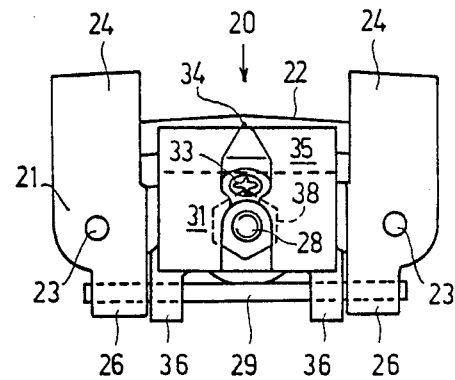

When the cover disk has been so placed, the traction screw 28 of each movable connection device 20 is turned by screwing the same into the threaded nut 38, and then the engagement member is pulled towards the supporting member 21, by rotating around axle 29, and projection 35 approaches the channel edge C until it firmly engages therein, as shown in FIG. 6. When this condition has been attained by all movable connection devices 20, the cover disk is positively fixed to the wheel rim. Of course, the opposite operations allow to quickly dismount the cover disk from the wheel.

It will be understood that the means for fixing the supporting member 21 to the cover disk edge 1 may be modified with respect to the fixing means described as an example, and that the shape of projection 35 may be suitably chosen depending on the shape of the concave channel edge C of the kind of wheel to which the cover disk is destined. The use of a traction screw 28 screwed into a nut 38 is a very practical means for controlling the displacement of the engagement member 31 from the mounting position to the fixing position and vice-versa, however also different means could be used to this effect.

As already said, the total number of connection devices, fixed 10 and movable 20, may vary depending on the various needs, but in any event, to the effect of an effective fixation, it is necessary that at least three connection devices are provided for in total, and that at least one thereof is of the movable type 20. It is preferred, however, to make use of three or four fixed connection devices 10 and of two movable connection devices 20.

Of course, the fixed connection devices 10 are cheaper than the movable able connection devices 20, and this reason may suggest to use connection devices of the two different kinds described. However it is to be understood that the fixed connection devices 10 could be omitted at all by using, all around the wheel cover disk, movable connection devices 20. In this case the movable connection devices 20 should be at least three in number, however it is preferred that they are four in number.

Preferably, in the projection 35 of engagement member 31 is screwed a screw 33 having a conical tip 34 which protrudes from the surface of projection 35 towards the channel edge C of the wheel rim. This tip 34 somewhat penetrates in the material, or at least in the paint, of channel edge C of the wheel rim, when the movable connection devices 20 are displaced to the fixing position. This is shown by FIG. 6 where, however, the entity of such penetration is somewhat exaggerated for more clear representation. In this way a very effective solidarity is obtained between the cover disk and the wheel rim, thus particularly preventing any angular displacement of the cover disk under action of the accelerations and decelerations of the wheel.

Finally, it is of advantage that two springs 37 (FIGS. 5 and 7) are housed in corresponding seatings of body 21, situated at both sides of traction screw 28. These springs are compressed by the engagement member 31 when it is displaced to the fixing position, and then they push the engagement member 31 towards the mounting position, and thus they make easier dismounting the cover disk when the traction screws 28 are unscrewed.

I claim:

1. A vehicle wheel cover disk having a mounting arrangement in order to allow positively fixing the cover disk to a wheel rim ending outside with a concave channel edge, wherein the mounting arrangement includes at least three connection devices spaced along the disk periphery in order to engage the concave channel edge of the wheel rim, and wherein at least one of said connection devices is movable and comprises an engagement member displaceable between a mounting position, in which it may pass inside said channel edge of the wheel rim, thus allowing mounting the cover disk onto the wheel, and a fixing position in which it engages said channel edge of the wheel rim, thus positively fixing the wheel cover disk; wherein each movable connection device comprises:
   a supporting member having means for being mounted onto the peripheral edge of the cover disk;
   an engagement member movable connected to said supporting member and movable between a mounting position and a fixing position, said engagement member having a first projection suitable for engaging, in the fixing position of said engagement member, the concave channel edge of the wheel rim, and for passing inside said channel edge in the mounting position of said engagement member;
   and means for displacing said engagement member from the mounting position to the fixing position and viceversa; said means for displacing the engagement member comprising a traction screw, housed in said supporting member, and a threaded nut housed in said engagement member, said traction screw being screwed into said nut.

2. A vehicle wheel cover disk having a mounting arrangement in order to allow positively fixing the cover disk to a wheel rim ending outside with a concave channel edge, wherein the mounting arrangement includes at least three connection devices spaced along the disk periphery in order to engage the concave channel edge of the wheel rim, and wherein at least one of said connection devices is movable and comprises an engagement member displaceable between a mounting position, in which it may pass inside said channel edge of the wheel rim, thus allowing mounting the cover disk onto the wheel, and a fixing position in which it engages said channel edge of the wheel rim, thus positively fixing the wheel cover disk; wherein each movable connection device comprises:
   a supporting member having means for being mounted onto the peripheral edge of the cover disk;
   an engagement member movably connected to said supporting member and movable between a mounting position and a fixing position, said engagement member having a first projection suitable for engaging, in the fixing position of said engagement member, the concave channel edge of the wheel rim, and for passing inside said channel edge in the mounting position of said engagement member;
   and means for displacing said engagement member from the mounting position to the fixing position and viceversa; said means for mounting the supporting member onto the peripheral edge of the cover disk comprising a second projection suitable for engaging an inwardly bent portion of the peripheral edge of the cover disk, and a screw connection to the peripheral edge of the cover disk.

3. A vehicle wheel cover disk having a mounting arrangement in order to allow positively fixing the cover disk to a wheel rim ending outside with a concave channel edge, wherein the mounting arrangement includes at least three connection devices spaced along the disk periphery in order to engage the concave channel edge of the wheel rim, and wherein at least one of said connection devices is movable and comprises an engagement member displaceable between a mounting position, in which it may pass inside said channel edge of the wheel rim, thus allowing mounting the cover disk onto the wheel, and a fixing position in which it engages said channel edge of the wheel rim, thus positively fixing the wheel cover disk; wherein each movable connection device comprises:
   a supporting member having means for being mounted onto the peripheral edge of the cover disk;
   an engagement member movably connected to said supporting member and movable between a mounting position and a fixing position, said engagement member having a first projection suitable for engaging, in the fixing position of said engagement member, the concave channel edge of the wheel rim, and for passing inside said channel edge in the mounting position of said engagement member;
   and means for displacing said engagement member from the mounting position to the fixing position and viceversa; said engagement member comprising a screw having a conical tip, screwed in said first projection of the engagement member and protruding toward said concave channel edge of the wheel rim.

4. A vehicle wheel cover disk having a mounting arrangement in order to allow positively fixing the cover disk to a wheel rim ending outside with a concave channel edge, wherein the mounting arrangement includes at least three connection devices spaced along the disk periphery in order to engage the concave channel edge of the wheel rim, and wherein at least one of said connection devices is movable and comprises an engagement member displaceable between a mounting position, in which it may pass inside said channel edge of the wheel rim, thus allowing mounting the cover disk onto the wheel, and a fixing position in which it engages said channel edge of the wheel rim, thus positively fixing the wheel cover disk; wherein each movable connection device comprises:

a supporting member having means for being mounted onto the peripheral edge of the cover disk;

an engagement member movably connected to said supporting member and movable between a mounting position and a fixing position, said engagement member having a first projection suitable for engaging, in the fixing position of said engagement member, the concave channel edge of the wheel rim, and for passing inside said channel edge in the mounting position of said engagement member;

and means for displacing said engagement member from the mounting position to the fixing position and viceversa; said supporting member having at least one seat, and at least one spring being housed in said seat facing said engagement member, in order to be compressed by said engagement member in the fixing position, and to push said engagement member towards the mounting position.

* * * * *